(12) United States Patent
Sheldon

(10) Patent No.: US 6,959,988 B1
(45) Date of Patent: Nov. 1, 2005

(54) EYEWEAR HAVING DETACHABLE LENS RETAINING MEMBER

(76) Inventor: Brent Sheldon, 315 Putney Street, St. Lambert, Quebec (CA) J4P 3B5

( * ) Notice: Subject to any disclaimer, the term of this patent is extended or adjusted under 35 U.S.C. 154(b) by 0 days.

(21) Appl. No.: 10/910,601

(22) Filed: Aug. 4, 2004

(51) Int. Cl.$^7$ .............................................. G02C 1/00
(52) U.S. Cl. .......................... 351/106; 351/62; 351/83; 351/86; 351/103
(58) Field of Search ................................ 351/106, 103, 351/86, 83, 41, 62; 2/435

(56) References Cited

U.S. PATENT DOCUMENTS

| | | | |
|---|---|---|---|
| 2,027,037 A | 1/1936 | Gotlieb | |
| 4,707,883 A | 11/1987 | Irani et al. | |
| 5,576,775 A * | 11/1996 | Bolle | 351/62 |
| 5,903,331 A * | 5/1999 | Lin | 351/105 |
| 6,149,268 A | 11/2000 | Hall et al. | |
| 6,561,647 B1 * | 5/2003 | Chen | 351/103 |
| 2002/0029408 A1 | 3/2002 | Lindahl | |

* cited by examiner

Primary Examiner—Hung Xuan Dang
(74) Attorney, Agent, or Firm—Ogilvy Renault LLP; Wayne H. Yan

(57) ABSTRACT

Eyewear is provided with an exchangeable lens retaining member which is removably attached to a lens to form a lens unit. The lens unit is detachably secured to the main frame of the eyewear such that the lens unit extends downwardly from the main frame. At least a section of the lens retaining member provides a spacing between a bottom of the main frame and the lens, where vent passages are defined.

18 Claims, 6 Drawing Sheets

US 6,959,988 B1

EYEWEAR HAVING DETACHABLE LENS RETAINING MEMBER

FIELD OF THE INVENTION

The present invention relates to eyewear, and more particularly to eyewear having detachable lens retaining members to form together with the lens of the eyewear, a lens unit to be detachably secured to a main frame of the eyewear.

BACKGROUND OF THE INVENTION

Conventional eyewear is generally catalogued into two groups. The first group includes swimming or diving goggles characterized by waterproof seals when the eyewear is in use. In this group, lenses are firmly secured to the eyewear structure, usually by flexible or semi-flexible sealing devices either integrated with the frame structures or additionally attached thereto, and flexible or semi-flexible seals are also provided to the frame structures to abut the user's face around the eyes in order to prevent water from contacting the user's eyes.

A second group of eyewear includes a variety of eyeglasses, protective work glasses and a particular type of sports glasses or goggles, which are all characterized as having no special sealing requirements in contrast to the swimming or diving goggles, and as permitting air ventilation. The lenses of eyewear are often in direct contact with or in a closely spaced relationship with certain areas of the face of the user such as the cheeks and the super-orbital arches. In such cases when the face perspires and the lenses are relatively cool or when the lenses are worn from a cold atmosphere into a warm moist atmosphere, moisture condenses on the surfaces of the lenses next to the face because circulation of air over the surface of the lens between the lens and the face of the user is limited, particularly when the eyewear frame is curved to fit the user's face. Conventionally, enhanced circulation of air over the surface of the lens between the lens and the face of the user is achieved by providing specially designed air passages through the frame structures or through the lenses of the eyewear.

In another aspect of the eyewear, although the lenses can be replaced, for example when broken, they are generally not designed for interchangeable use. In today's lifestyle however, an eyewear user often needs more than one eyewear to meet various vision needs, whether for functional or styling reasons. For example, a sunglass user may prefer a selected styling for general use, but prefer sunglasses with better ventilation when used during sports activities.

Therefore, improved eyewear is desirable in order to overcome the shortcomings of conventional eyewear and to provide more variety for user selection.

SUMMARY OF THE INVENTION

One object of the present invention is to provide improved eyewear to overcome the shortcomings of the conventional eyewear and to provide a variety of eyewear for user selection.

In accordance with one aspect of the present invention, there is provided eyewear which comprises a main frame, at least one lens and a lens retaining member. The main frame includes an elongate base and a pair of arms attached to opposed ends of the elongate base, respectively. The lens retaining member is removably attached to the at least one lens to form a lens unit. The lens unit is detachably secured to the elongate base of the main frame such that the lens unit extends downwardly from the main frame and at least a portion of the lens retaining member provides spacing between a bottom of the main frame and the at least one lens.

The lens retaining member preferably comprises a plurality of vent passages between the main frame and the at least one lens, and the vent passages are preferably angled away from the eyes of the user when the eyewear is in use.

The lens unit preferably comprises first engaging elements at a top thereof while the elongate base of the main frame comprises second engaging elements for detachable engagement with the first engaging elements. The eyewear of the present invention preferably further includes a nose support member which is alternatively attached to the at least one lens, attached to the lens retaining member, or attached to the main frame.

In one embodiment of the present invention, the lens retaining member is positioned at a top periphery of the at least one lens to form the lens unit.

In another embodiment of the present invention, the lens retaining member is configured to surround the entire periphery of the at least one lens to form the lens unit.

The lens retaining member advantageously provides spacing between the bottom of the main frame and the at least one lens to have selected ventilation passages therethrough. Therefore, the main frame and the lens of the eyewear do not have to be configured with ventilation passages. Selection of having ventilation passages or not, and selection of various patterns of the ventilation passages can be achieved by changing lens retaining members. Another advantage of the present invention lies in that a variety of selected features of the lens retaining members other than the ventilation passages can be easily added to the eyewear to which the lens unit is attached, thereby changing the properties and style of the eyewear in order to satisfy the user's preferences.

Other features and advantages of the present invention will be better understood with reference to the preferred embodiments described hereinafter.

BRIEF DESCRIPTION OF THE DRAWINGS

Having thus generally described the nature of the present invention, reference will now be made to the accompanying drawings, showing by way of illustration the preferred embodiments thereof, in which.

DETAILED DESCRIPTION OF THE PREFERRED EMBODIMENT

Figure 4:
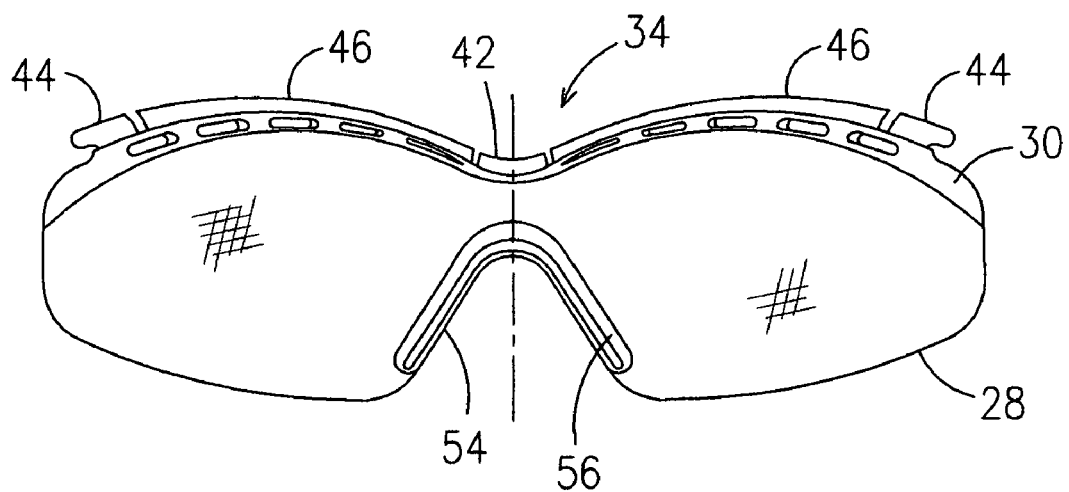
FIG. 4 is a lens unit used in the eyewear of FIG. 1, formed with a single lens and a lens retaining member attached to a top thereof.
Figure 5:
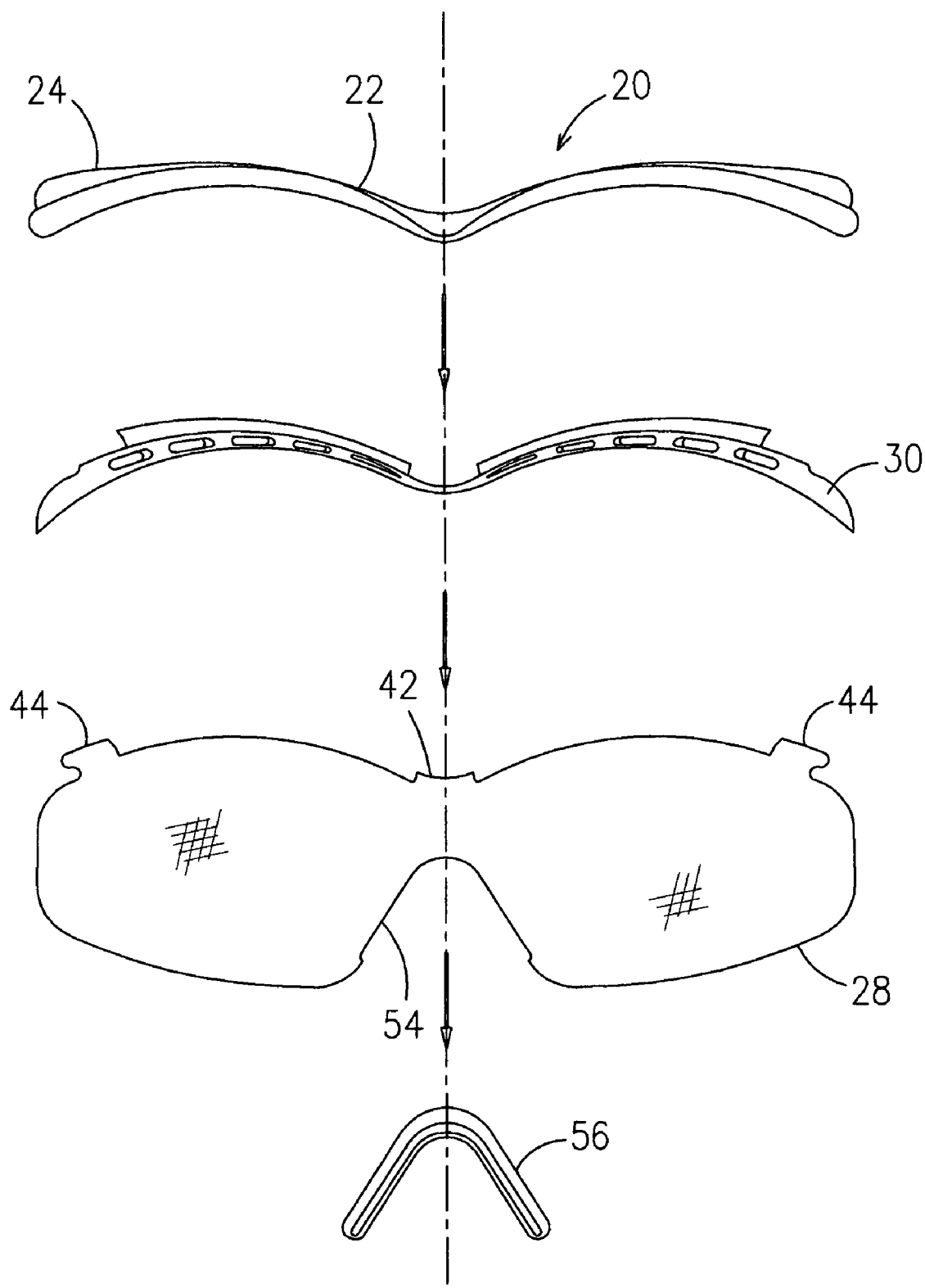
FIG. 5 is front elevational exploded view of the eyewear of FIG. 1.

Referring to FIGS. 1–5, an eyewear such as sunglasses, protective work glasses, sports goggles, optical eyeglasses, etc., is used as an example to illustrate one embodiment of the present invention as generally indicated by numeral 20, which includes a main frame 22, preferably made of a rigid plastic material. The main frame 22 includes an elongate base 24 preferably having a curvature so as to fit with a user's face, and a pair of arms 26 pivotally attached to opposed ends of the elongate base 14, respectively. The eyewear 20 further includes a single lens 28 and a lens retaining member 30 removably attached to the single lens 28 to form a lens unit 34 (as shown in FIG. 4). The lens unit 34 is detachably secured to the elongate base 24 of the main frame 22 such that the lens unit 34 extends downwardly from the main frame and the lens retaining member 30 provides spacing between the bottom of the main frame 22 and the single lens (see FIG. 3).

A plurality of openings 32 extending through the lens retaining member 30 are provided to function as vent passages between the main frame 22 and the single lens 28. These passages are preferably angled away from the user's eyes when the eyewear is in use. Nevertheless, the openings 32 can be omitted from the lens retaining member 30 if the vent passages are not desired. The lens retaining member 30 is detachable from both the main frame 22 and the single lens 28 such that the lens retaining member 22 can be exchanged with selected variety of lens retaining members of various styles and/or providing different functions, for example, with or without ventilation, or perhaps using different materials to increase the weight of eyewear or to provide a floatable feature to the eyewear for use in water sports.

In order to secure the lens unit 34 to the elongate base retaining base 24 of the main frame 22, the lens unit 34 is provided with engaging elements, preferably male engaging elements, at the top thereof for engagement with engaging elements, preferably female engaging elements, defined in the elongate base 24 of the main frame 22.

With reference to FIGS. 3–8, the particular engaging arrangement between the lens unit 34 and the main frame 22 and the engaging arrangement between the lens retaining member 30 and the single lens 28 in this embodiment of the present invention is described hereinafter. The lens retaining member 30 is similar in shape to the elongate base 24 of the main frame 22, and has a curvature similar to the elongate base 24. The lens retaining member 30 defines an elongate groove 36 in the bottom thereof along a major length thereof for receiving the top periphery of the single lens 28. The lens retaining member 30 further includes a central opening 38 and two end openings 40 for receiving a central protruding member 42 and two end protruding members 44 of the single lens 28 to extend therethrough. The protruding members 42 and 44 extend upwardly from the top of the single lens 28 through the openings 38 and 40 respectively, of the lens retaining member 30, and further protrude upwardly from the top of the lens retaining member 30, as seen in FIG. 4. The lens retaining member 30 is restrained by the protruding members 42, 44 from lateral movement relative to the single lens 28, when the lens retaining member 30 is attached to the single lens 28 to form the lens unit 34.

The lens retaining member 30 includes a top portion thereof forming two upwardly protruding sections 46, each being located between the central opening 30 and one end opening 40 such that when the lens retaining member 30 is attached to the single lens 28, the protruding sections 46 extend upwardly between the upwardly extending central protruding member 42 and the respective end protruding members 44 of the single lens 28. The end protruding elements 44 are shaped like hooks for engagement with the main frame 22.

The elongate base 24 of the main frame 22 defines a groove 48 in the bottom thereof, extending along a major section thereof for receiving the protruding sections 46 of the lens retaining member 30 and the protruding members 42, 44 of the single lens 28. The groove 48 has a curved length between two opposed ends thereof which are smaller than the curvature length along the top of the lens unit 34 between the two extremities of the end protruding members 44. Each end of the groove 48 includes a recess 50. Thus, when the lens unit 34 is attached to the main frame 22, the protruding sections 46 of the lens retaining member 30 and the protruding members 42, 44 of the single lens 28 are received in the groove 48 of the elongate base 24 and the hook portion of each end protruding member 44 extends into the end recess 50. The end recess 50 as an engaging element provides a step 52 for engagement with the hook portion of the end protruding member 44 such that the lens unit 34 is detachably secured to the elongate base 24 of the main frame 22. For convenience of manufacturing, the end recess 50 forms an opening on the inner side of the elongate base 24. The lens unit 34 can be detached from the main frame 22 by pulling the lens unit 34 at the middle portion thereof downwardly and then forwardly away from the main frame 22.

The single lens 28 preferably defines a nose recess 54 at a center of a bottom periphery thereof. A nose support member 56 is positioned at the nose recess 54 and attached to the single lens 28 by well known means.

In FIGS. 9–12, an eyewear according to another embodiment of the present invention and generally indicated by numeral 120 includes a main frame 122, a lens retaining member 130 and a single lens 128. The lens retaining member 130 is removably attached to the single lens 128 to form a lens unit 134 which is detachably secured to the main frame 122.

Figure 1:
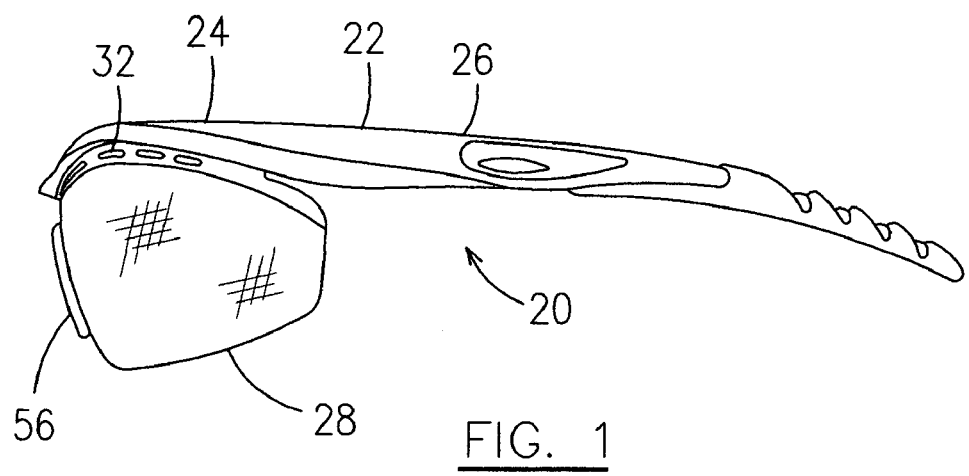
FIG. 1 is a side elevational view of eyewear according to one embodiment of the present invention.
Figure 2:
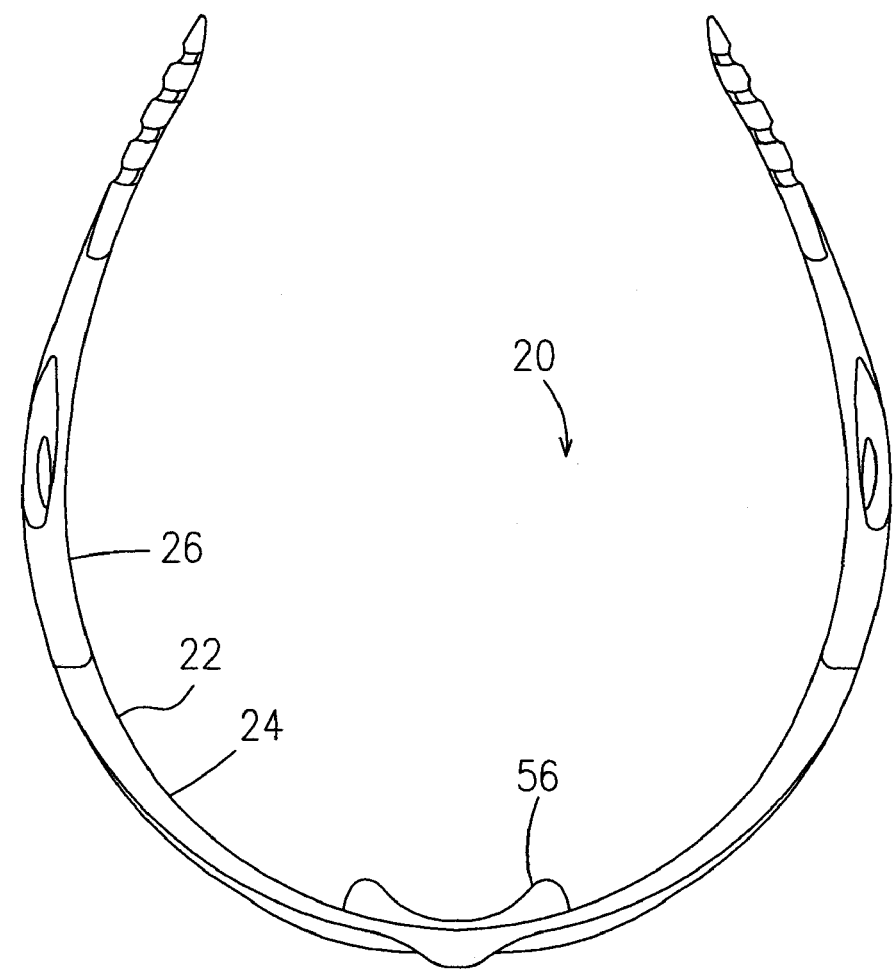
FIG. 2 is a top plane view of the eyewear of FIG. 1.
Figure 3:
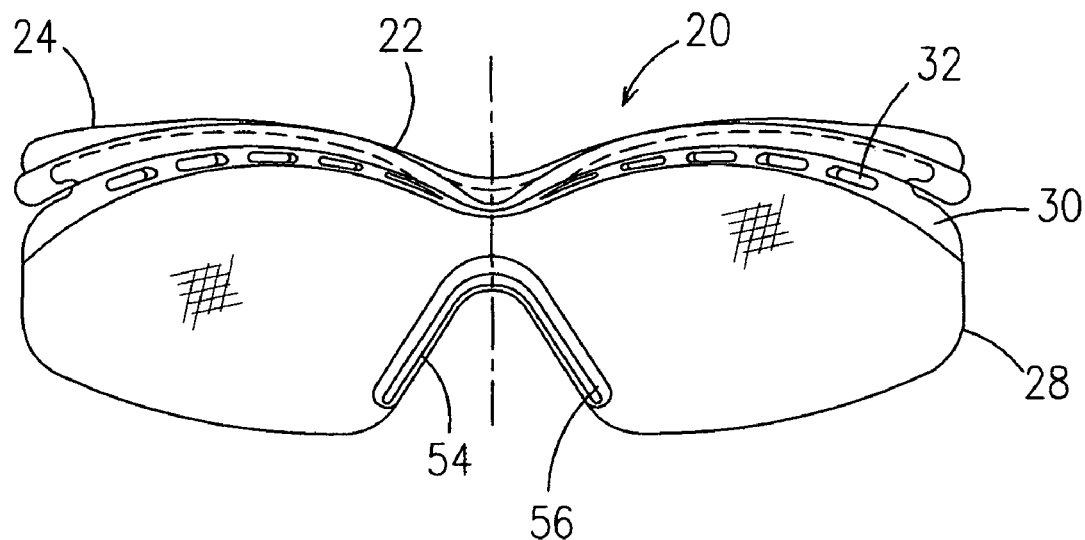
FIG. 3 is a front elevational view of the eyewear of FIG. 1, with two arms removed.
Figure 6A:
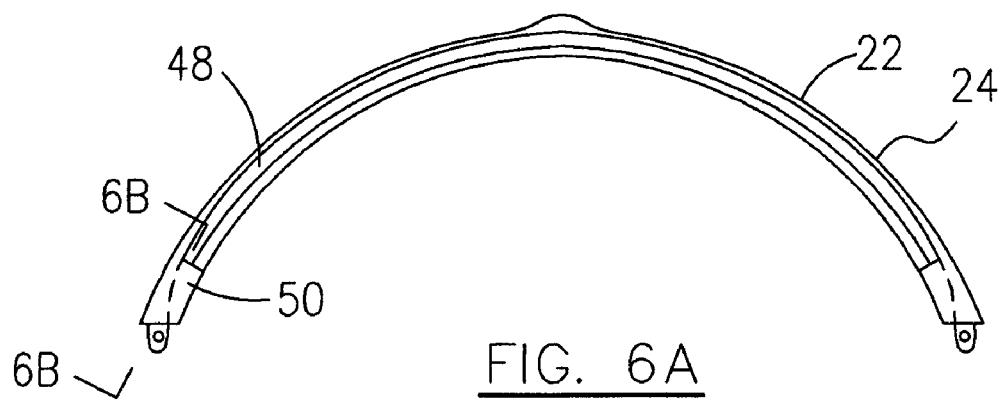
FIG. 6A is a bottom plane view of an elongate base of the main frame showing an elongate groove therein for receiving a top portion of the lens retaining member therein.
Figure 6B:
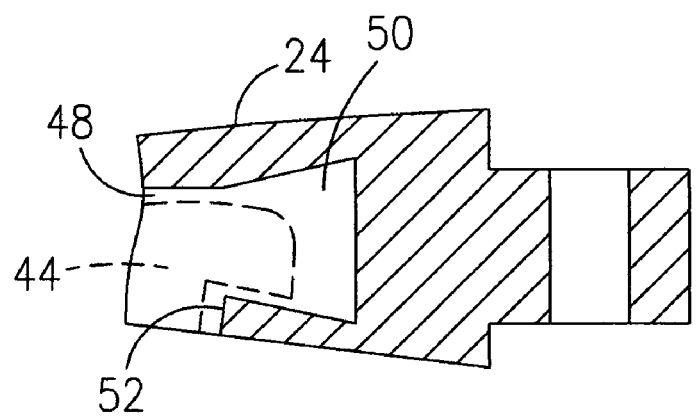
FIG. 6B is a partial and elevational cross-section of the elongate base of the main frame of FIG. 6A, taken along lines 6B—6B and being turned to the elevational position, showing a configuration thereof for engagement with the lens unit of FIG. 4.
Figure 7:
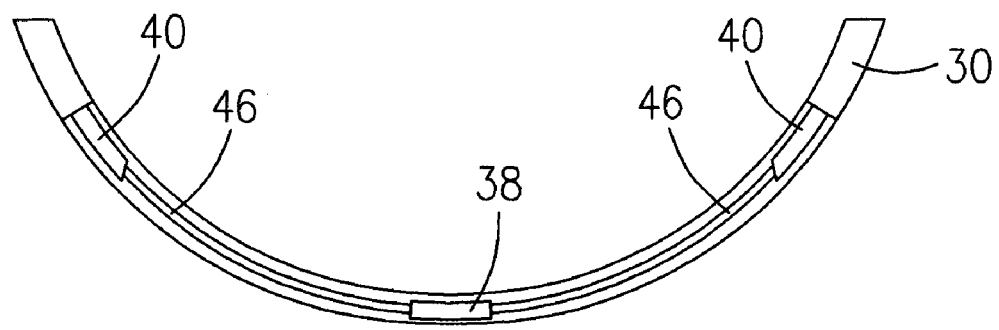
FIG. 7 is a top plane view of the lens retaining member used in the eyewear of FIG. 1, showing the upwardly protruding sections thereof and openings extending therethrough.
Figure 8:
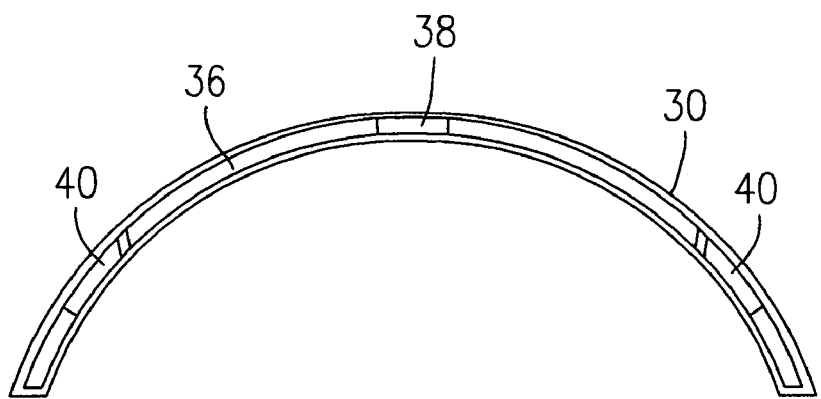
FIG. 8 is a bottom plane view of the lens retaining member of FIG. 7, showing an elongate groove therein and the same openings extending therethrough as in FIG. 7.
Figure 9:
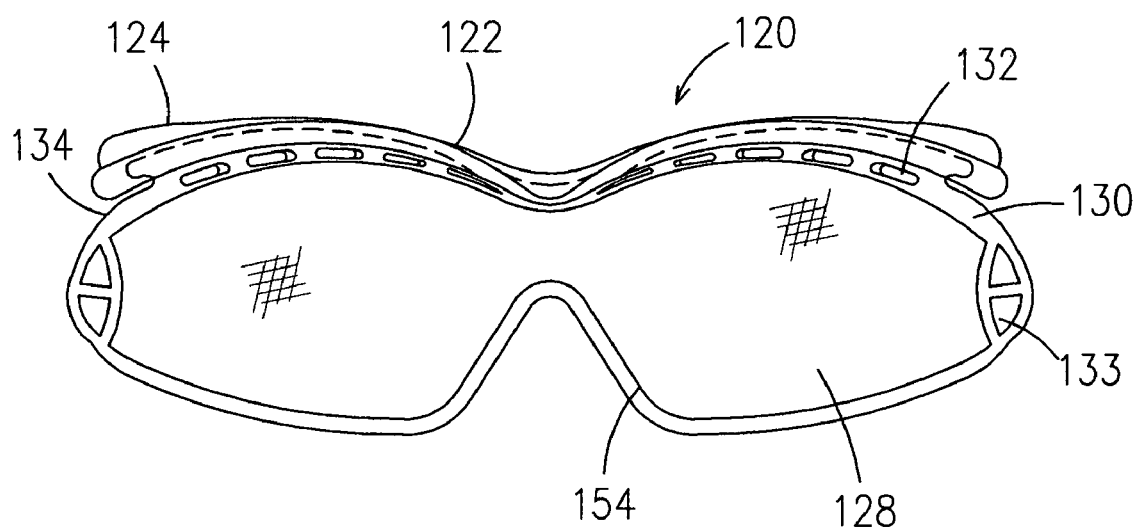
FIG. 9 is a front elevational view of an eyewear according to another embodiment of the present invention, with arms removed.
Figure 10:
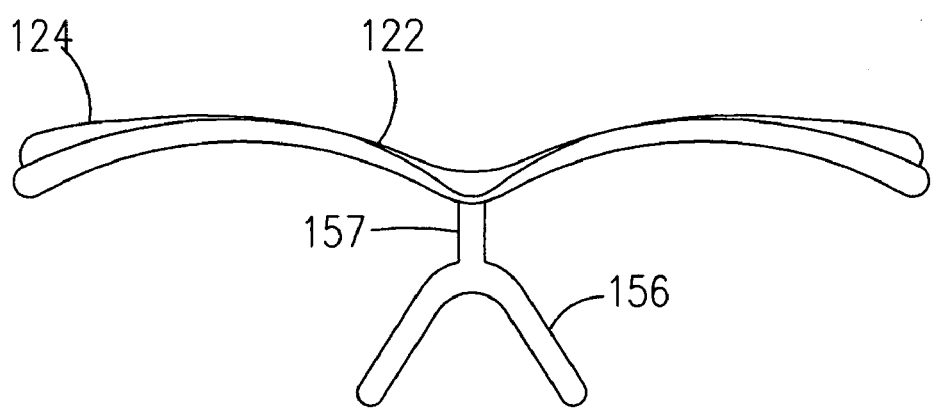
FIG. 10 is front elevational view of an elongate base of the main frame having a nose support member attached thereto, used in the eyewear of FIG. 9.
Figure 11:
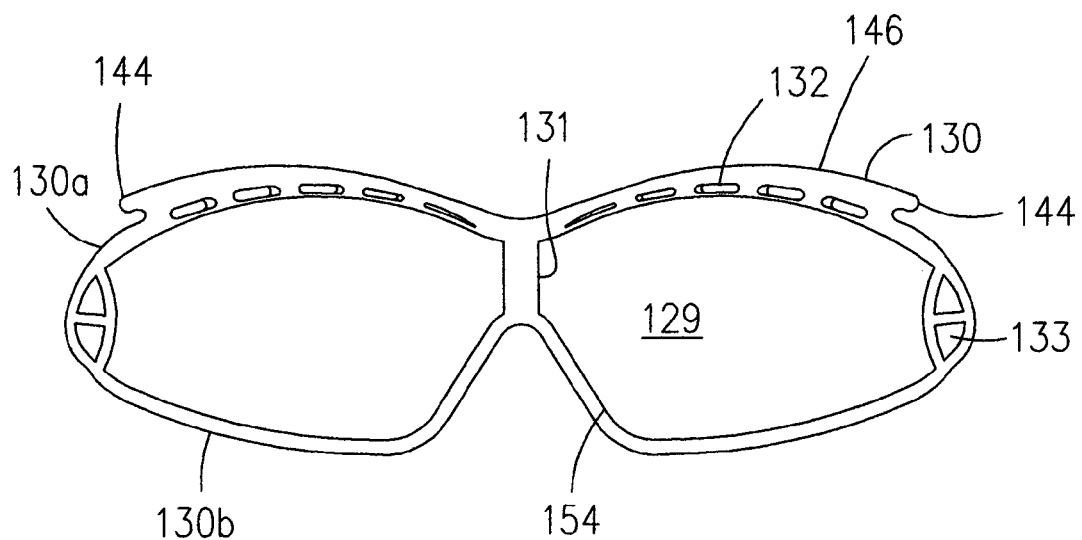
FIG. 11 is front elevational view of a lens retaining member used in the eyewear of FIG. 9.
Figure 12:
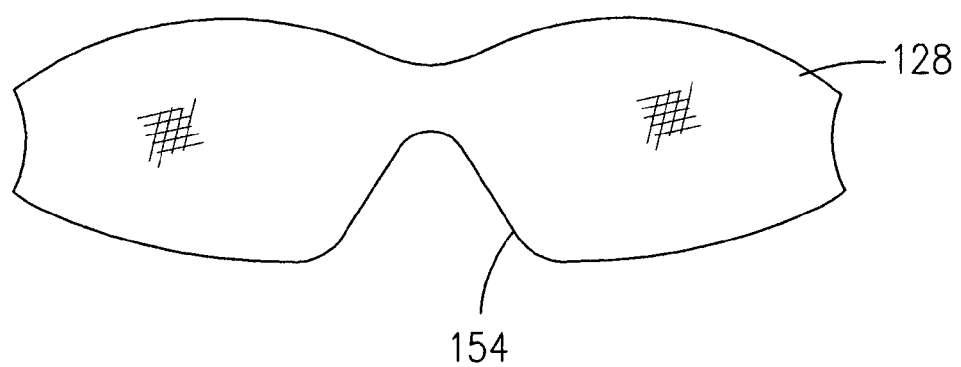
FIG. 12 is front elevational view of a single lens used in the eyewear of FIG. 9.

The main frame 122 includes an elongate base 124 with two arms (not shown) pivotally attached to the opposed ends of the elongate base 124, similar to the eyewear of FIGS. 1 and 2. The main frame 122 further includes engaging elements similar to the groove 48 and recess 50 of the main frame 22 as shown in FIGS. 6A and 6B of the eyewear 20 of FIG. 1, and will not therefore be redundantly described.

The lens retaining member 130 has an upper section 130A and a lower section 130B integrated to define an opening 129 profiled in accordance with the periphery of the single lens 128, in order to surround the entire periphery of the single lens 128 to form the lens unit 134. The single lens 128 has a nose recess 154 at the center of the bottom periphery thereof, and the lens retaining member 130 is configured similarly with such a nose recess at the center of the lower section 130B. A continuous groove (not shown) is defined along the inner periphery of the lens retaining member 130 for receiving the periphery of the single lens 128 therein for attachment thereto. Similar to the eyewear of FIG. 1, a plurality of spaced apart openings 132 are provided in the upper section 130A of the lens retaining member 130 to form the vent passages between the main frame 122 and the single lens 128. Additional vent passages are formed by openings 133 defined in the enlarged end portions of the lens retaining member 130. A central member 131 is provided to interconnect centers of the respective upper and lower sections 130A, 130B of the lens retaining member 130 in order to increase the rigidity of the lens retaining member 130, thereby ensuring the secure attachment of the lens retaining member 130 to the single lens 128. The central member 131 can be positioned either in front of or behind the single lens 128. When the eyewear 120 is a pair of sunglasses, the central member 131 positioned behind the dark coloured single lens 128, is shaded, resulting in an eyewear style different from eyewear having the central member 131 positioned in front of the single lens 128.

It should be noted that the lens retaining member can be configured in various types according to the present invention, and cannot be exhaustively described herein.

The eyewear 120 further includes a nose support member 156 positioned at the nose recess 154 of the single lens 128, but as an alternative arrangement to the eyewear 20 of FIG. 1, is attached to the main frame 122 rather than to the single lens 128. In particular, the nose support member 156 has a connecting member 157, preferably integrated with the elongate base 124 such that the nose support member 156 extends downwardly from the center of the elongate base 124.

As another alternative arrangement to the eyewear 20 of FIG. 1, the single lens 128 has a smooth top periphery and does not include any upwardly protruding members. Instead, the lens retaining member 130 has an upwardly protruding section 146 extending along a major length of the upper section 130A thereof to be received in the groove of the elongate base 124 of the main frame 122. The opposed ends of the upwardly protruding section 146 are formed with hook portions 144 for engagement with the end recesses defined at the opposed ends of the groove in the elongate base 124 of the main frame 122.

It should be noted that the particular engaging elements described in the two above embodiments are exemplary and any type of detachable engaging arrangement such as pins and holes, can alternatively be used in the present invention.

It should also be noted that the present invention can be applied to various types of eyewear including sunglasses, protective and sports glasses, goggles, etc. Although the two embodiments described in this application have a single lens, it should be understood that the present invention is also applicable to the eyewear having a pair of lenses. In such a case, the respective lenses can be attached to a single lens retaining member to form a single lens unit, or alternatively first and second lens retaining members can be employed to form together with the respective lenses, two separate lens units which are detachably secured to the elongate base at left and right sides, respectively.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

I claim:

1. Eyewear comprising:
a main frame having an elongate base and a pair of arms attached to opposed ends of the elongate base, respectively;
at least one lens;
a lens retaining member removably attached to the at least one lens to form a lens unit, the lens unit being detachably secured to the elongate base of the main frame such that the lens unit extends downwardly from the main frame and at least a portion of the lens retaining member provides spacing between a bottom of the main frame and the at least one lens.

2. The eyewear as claimed in claim 1 wherein the lens retaining member comprises a plurality of vent passages between the main frame and the at least one lens.

3. The eyewear as claimed in claim 2 wherein the vent passages are angled away from the eyes of a user when the eyewear is in use.

4. The eyewear as claimed in claim 1 wherein the lens unit comprises first engaging elements at a top thereof and wherein the elongate base of the main frame comprises second engaging elements for detachable engagement with the first engaging elements.

5. The eyewear as claimed in claim 3 wherein the first engaging elements comprise a pair of male engaging elements spaced apart from each other, and wherein the second engaging elements comprise a pair of female engaging elements positioned corresponding to the male engaging elements for engagement with same.

6. The eyewear as claimed in claim 5 wherein the second engaging element further comprises a groove extending along a section of the elongate base of the main frame for receiving a top portion of the lens retaining member therein.

7. The eyewear as claimed in claim 6 wherein the top portion of the lens retaining member comprises at least one upwardly protruding section located between the pair of male engaging elements.

8. The eyewear as claimed in claim 7 wherein the at least one lens defines a nose recess at a center of a bottom periphery thereof.

9. The eyewear as claimed in claim 8 wherein the lens unit further comprises a nose support member positioned at the nose recess and attached to the at least one lens.

10. The eyewear as claimed in claim 8 wherein the lens unit further comprises a nose support member positioned at the nose recess and attached to the lens retaining member.

11. The eyewear as claimed in claim 8 wherein the lens unit further comprises a nose support member positioned at the nose recess and attached to the main frame.

12. The eyewear as claimed in claim 8 wherein male engaging elements are integrated with the lens retaining member.

13. The eyewear as claimed in claim 8 wherein the male engaging elements are integrated with the at least one lens.

14. The eyewear as claimed in claim 8 wherein the lens retaining member is positioned at a top periphery of the at least one lens to form the lens unit.

15. The eyewear as claimed in claim 14 wherein the lens retaining member comprises a groove for receiving the top periphery of the at least one lens.

16. The eyewear as claimed in claim 8 wherein the lens retaining member is configured to surround an entire periphery of the at least one lens to form the lens unit.

17. The eyewear as claimed in claim 16 wherein the lens retaining member comprises a central member interconnecting centers of respective upper and lower sections of the lens retaining member.

18. The eyewear as claimed in claim 16 wherein the lens retaining member comprises a continuous groove for receiving the entire periphery of the at least one lens therein.

* * * * *